(12) United States Patent
Kojima et al.

(10) Patent No.: US 7,372,395 B2
(45) Date of Patent: May 13, 2008

(54) GROUND-SPEED MEASURING APPARATUS

(75) Inventors: Takao Kojima, Hitachi (JP); Satoru Kuragaki, Isahara (JP); Shiho Izumi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 736 days.

(21) Appl. No.: 10/872,457

(22) Filed: Jun. 22, 2004

(65) Prior Publication Data
US 2007/0159381 A1 Jul. 12, 2007

(30) Foreign Application Priority Data
Jun. 30, 2003 (JP) ............... 2003-186083
Jun. 7, 2004 (JP) ............... 2004-167900

(51) Int. Cl.
*G01S 13/60* (2006.01)

(52) U.S. Cl. .................. 342/104; 342/117

(58) Field of Classification Search ......... 342/104, 342/117; 367/91
See application file for complete search history.

(56) References Cited

U.S. PATENT DOCUMENTS

| | | | | |
|---|---|---|---|---|
| 3,910,647 | A * | 10/1975 | Takeuchi ............... | 303/193 |
| 4,148,028 | A * | 4/1979 | Fujiki ..................... | 342/70 |
| 4,517,566 | A * | 5/1985 | Bryant et al. ............ | 342/117 |
| 5,475,620 | A * | 12/1995 | Kuzuya et al. .......... | 367/91 |
| 6,097,671 | A * | 8/2000 | Merewether ........... | 367/91 |
| 6,445,337 | B1 * | 9/2002 | Reiche .................... | 342/104 |
| 7,136,736 | B2 * | 11/2006 | Kuragaki et al. ........ | 342/104 |
| 2004/0138802 | A1 * | 7/2004 | Kuragaki et al. ........ | 701/70 |
| 2007/0159381 | A1 * | 7/2007 | Kojima et al. .......... | 342/104 |

FOREIGN PATENT DOCUMENTS

| | | |
|---|---|---|
| EP | 0462648 | 12/1991 |
| EP | 0686856 | 12/1995 |
| JP | H11-352225 | 12/1999 |
| WO | WO 01/27653 | 4/2001 |

OTHER PUBLICATIONS

Patent Abstracts of Japan 11-352225.
Microwave Front End for True Ground Speed Measurements Journal of Navigation, pp. 88-96, vol. 48, No. 1, 1995.

* cited by examiner

*Primary Examiner*—Dan Pihulic
(74) *Attorney, Agent, or Firm*—Crowell & Moring LLP

(57) ABSTRACT

This invention provides a ground-speed measuring apparatus for a vehicle that can detect a velocity along the movement of the vehicle (in the fore direction), a velocity across the movement of the vehicle (in the athwartships direction), a side-skid angle of the vehicle, and an angular velocity of the vehicle.

A ground-speed measuring apparatus comprising three or more transceivers each of which contains a transmitter for transmitting a wave and a receiver for receiving a reflection of the wave transmitted from the transmitter, wherein at least three of said transceivers are placed outside a cylindrical area whose axis of symmetry passes through a point on the floor of the vehicle, three straight lines which respectively pass through said transceivers perpendicularly thereto intersect with each other or skewed in said cylindrical area, and the transmitter of each transceiver is at a preset angle with the floor of the vehicle.

16 Claims, 13 Drawing Sheets

OVERHEAD VIEW

OVERHEAD VIEW

OVERHEAD VIEW

DOTTED : SIGNAL LINE
SOLID LINE : HYDRAULIC PIPE

WORM'S-EYE VIEW

WORM'S-EYE VIEW

WORM'S-EYE VIEW

WORM'S-EYE VIEW

WORM'S-EYE VIEW

WORM'S-EYE VIEW

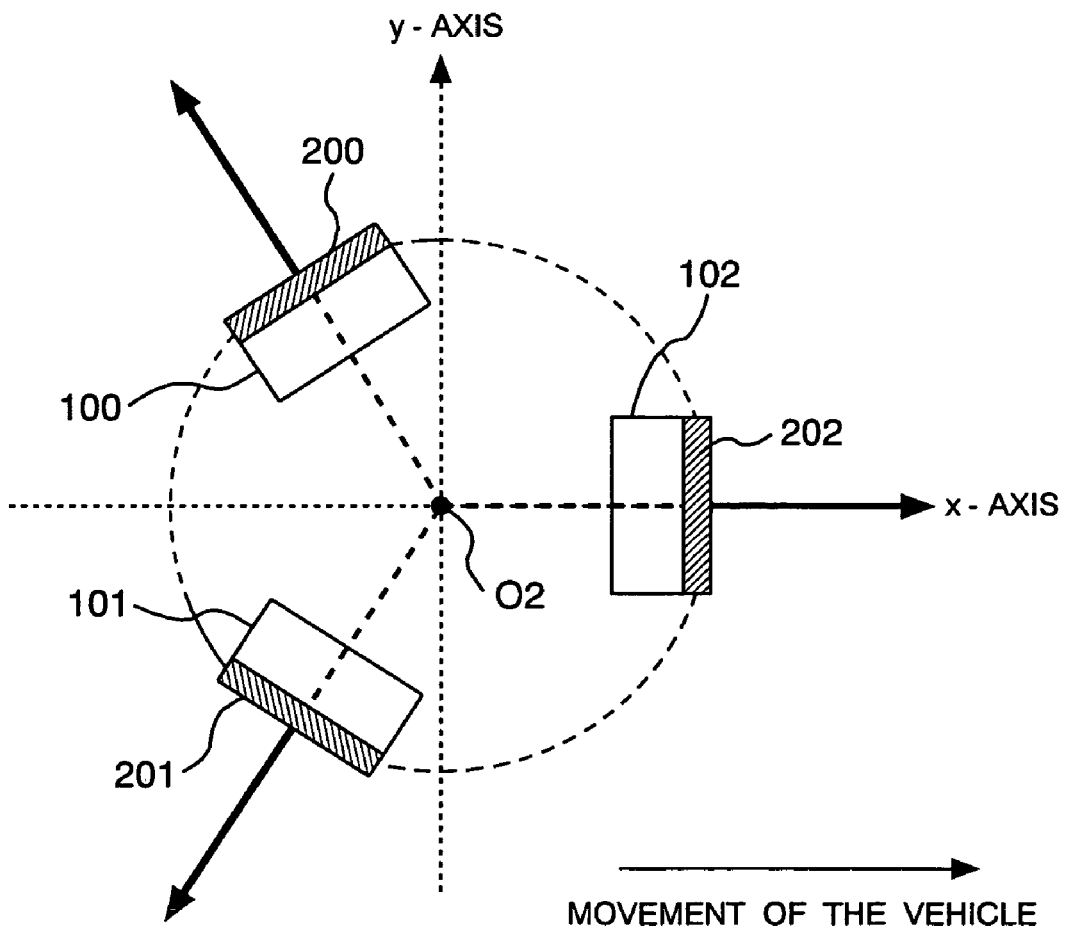

LATERAL VIEW

BOTTOM VIEW

LATERAL VIEW

BOTTOM VIEW

GROUND-SPEED MEASURING APPARATUS

CLAIM OF PRIORITY

The present application claims priority from Japanese application serial no. 2003-186083, filed on Jun. 30, 2003, and Japanese application serial no. 2004-167900, filed on Jun. 7, 2004, the contents of which are hereby incorporated by reference into this application.

FIELD OF THE INVENTION

This invention relates to a ground-speed measuring apparatus for a vehicle and a method of mounting thereof on a vehicle.

BACKGROUND OF THE INVENTION

A Janus-type Doppler ground-speed measuring apparatus has been well known as an apparatus for measuring ground speeds of vehicles (e.g. "Microwave Front End for True Ground Speed Measurements" by J. Kehrbeck et al., Journal of Navigation, pp. 88-96, Vol. 48, No. 1, 1995). The Janus-type system has two Doppler ground-speed measuring apparatus in the fore and aft directions of a vehicle to reduce deterioration in precision of detection due to assembling errors, road conditions, and unbalancing of loads in the fore and aft directions.

Japanese Application Patent Laid-open Publication No. Hei 11-352225 discloses a ground speed measuring apparatus that enables measurement of speeds in fore, aft, and athwartship directions of the vehicle by employing three radio beams originated from transmitting means which are disposed on vertices of a certain equilateral triangle.

SUMMARY OF THE INVENTION

The above Janus-type Doppler ground-speed measuring apparatus, however, cannot measure the velocity in the athwartship direction of the vehicle because the Janus-type is designed to measure velocities only in the fore direction of the vehicle.

Further, the ground speed measuring apparatus of Japanese Application Patent Laid-open Publication No. Hei 11-352225 has a problem that, when the vehicle or the body rotates in the yawing direction (in a plain parallel to the road surface) around the center 02 of an equilateral triangle as shown in FIG. 12, it is impossible to measure a velocity component in the yawing direction (angular velocity).

This invention is made to solve the above problem. An object of this invention is to provide an apparatus that can measure velocities in the fore, aft, and athwartship directions, side-skid angles of the vehicle, and angular velocities of the vehicle.

In an aspect of the invention, a ground-speed measuring apparatus comprises three or more transceivers each of which contains a transmitter for transmitting a wave and a receiver for receiving a reflection of the wave transmitted from the transmitter, wherein at least three of said transceivers are placed outside a cylindrical area whose axis of symmetry passes through a point on the floor of the vehicle, three straight lines which respectively pass through said transceivers perpendicularly thereto intersect with each other or skewed in said cylindrical area, and the transmitter of each transceiver is at a preset angle with the floor of the vehicle.

BRIEF DESCRIPTION OF DRAWINGS

FIG. 12 shows a top view of a ground speed measuring apparatus of a prior art.

DESCRIPTION OF THE PREFERRED EMBODIMENTS

This invention will be described in further detail by way of embodiments.

Figure 1:
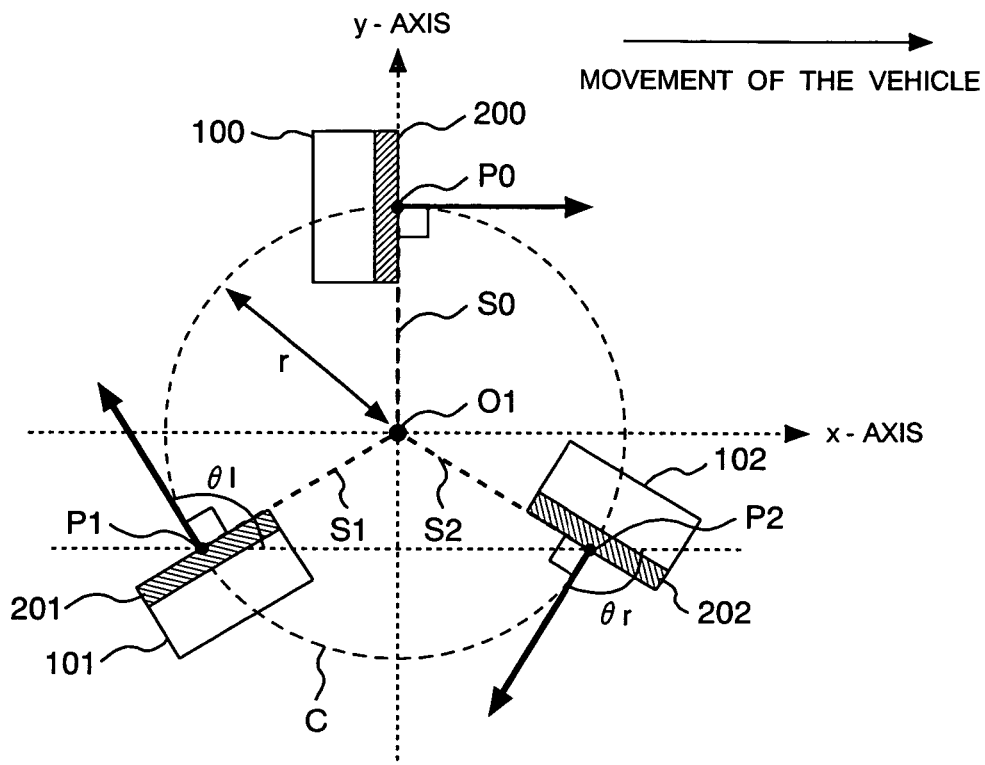
FIG. 1 shows a top view of a ground speed measuring apparatus which is an embodiment of this invention.
Figure 4:
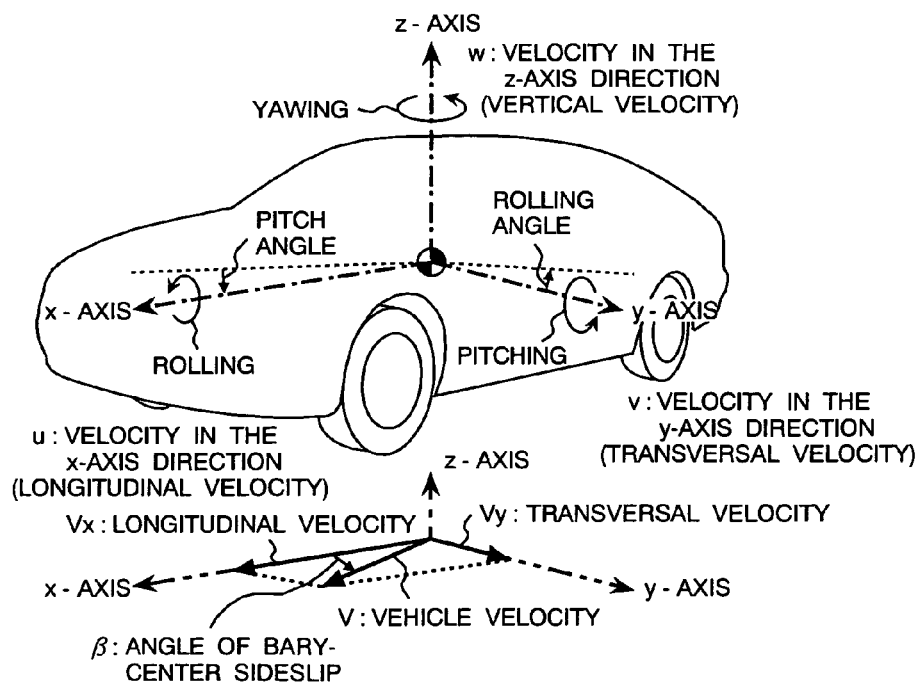
FIG. 4 shows an example of coordinate axes used for vehicle control.

FIG. 1 shows a ground speed measuring apparatus which is an embodiment of this invention. Peculiarly, FIG. 1 shows a top view of a Doppler type ground speed measuring apparatus. The x- and y-axes of the apparatus mounted on a vehicle represent the same axes of FIG. 4.

In FIG. 1, transceiving means 100, 101, and 102 respectively transmit waves and receive their reflections upon the road surface. C is a circle of a radius r with a point O1 as the center. The transceiving means 100, 101, and 102 are placed on points P0, P1, and P2 on the circle C so that they may respectively transmit waves tangentially to the circle (when viewed from the above).

Although transceiving means 100, 101, and 102 seem to transmit waves in the in-plane direction in parallel with the circle C in FIG. 1, they substantially transmit waves to the road surface. Therefore, the transceivers 200, 201, and 202 of the transceiving means are respectively disposed at a depression angle θ with a plane including the circle C. Here, 203 represents a vehicle structure (such as a chassis) and 204 represents the road surface.

In FIG. 1, the dotted circle C, the x-axis, the y-axis, the dotted lines S0, S1, and S2 are given to explain the positional relationship of the transceiving means 100, 101, and 102 for the sake of convenience.

Figure 3:
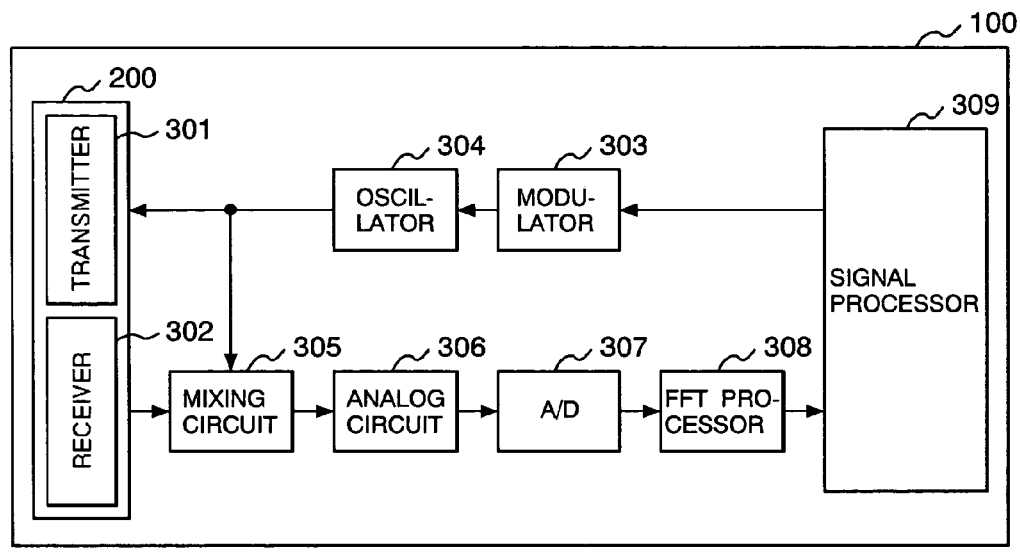
FIG. 3 shows a ground speed measuring apparatus which is an embodiment of this invention.
Figure 5:
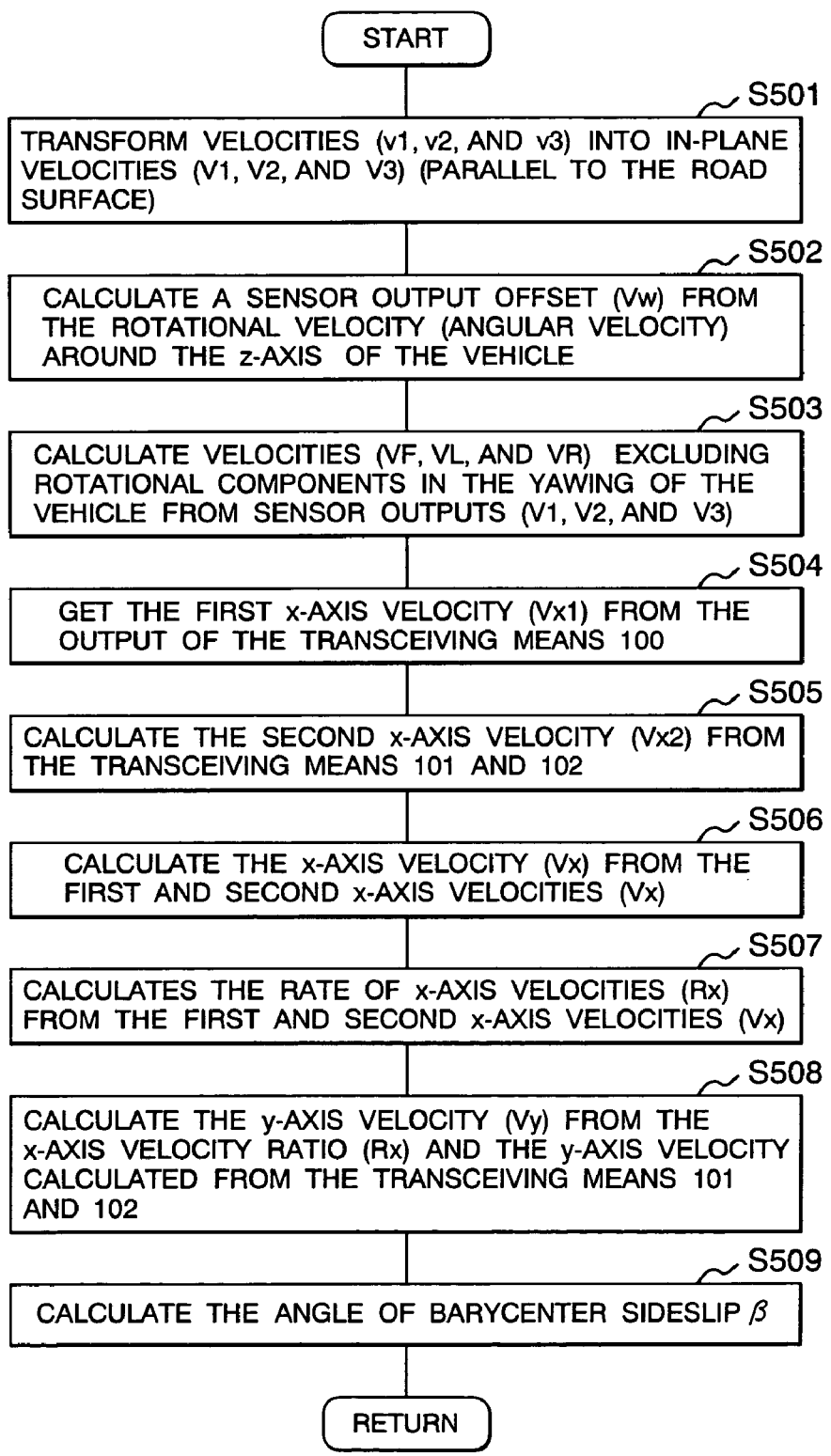
FIG. 5 shows an example of flow chart to measure velocities in accordance with this invention.

Referring to FIG. 3 and FIG. 5, we explain below an example of calculating velocities in the fore, aft, and athwartship directions of a vehicle and a side-skid angle by the ground speed measuring apparatus of FIG. 1.

Figure 2:
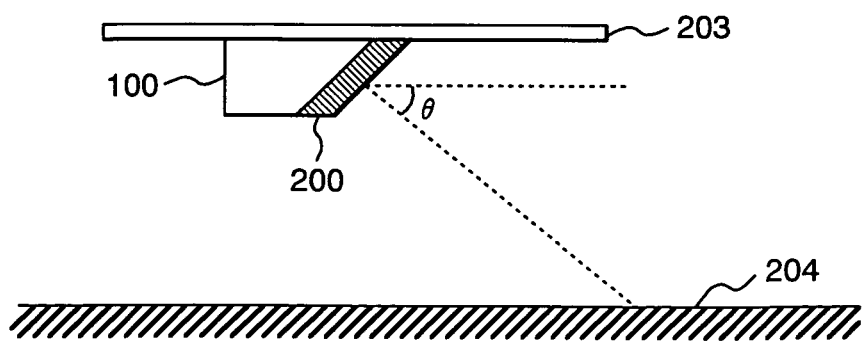
FIG. 2 shows a side view of a ground speed measuring apparatus which is an embodiment of this invention.

FIG. 3 shows an example of functional block diagram of the transceiving means 100, 101, and 102. This example assumes that the transceiving means 100, 101, and 102 transmit and receive radio waves. Referring to FIG. 2, the transceiver 200 comprises a transmitter 301 and a receiver 302. The transmitter 301 receives a radio wave modulated at a transmission frequency due to a modulation signal from the modulator 303 and emits the radio wave to the road surface. The radio wave reflected upon the road surface is received by the receiver 302 and frequency-converted by the mixing circuit 305. The mixing circuit 305 mixes this signal with a signal coming from the oscillator 304 and sends the resulting low-frequency signal to the analog circuit 306. This low-frequency signal is amplified by the analog circuit 306, converted into a digital signal (as sample data) by the analog/digital (A/D) converter 307, and fed to the FFT processor section 308. The FFT processor section 308 performs a fast Fourier transform on the digital signal (sample data). The result represents the frequency spectrum of the received beat signal in all frequency bands. The signal processor section 309 detects peaks in the result of the FFT processing, applies a Doppler frequency fd to the detected peak, and calculates a velocity v by Equation 1 below.

$$v = (c \cdot fd)/(2 \cdot ft) \qquad \text{(Equation 1)}$$

wherein fd is a Doppler frequency. c is the velocity of light. ft is the frequency of the transmitted wave.

In FIG. 1, the transmitting direction of the transceiving means 101 and 102 are the angle of θ1 and θr on the basis of the transmitting direction of the transceiving means 100, respectively. Moreover, the speed calculated by Equation 1 based on the signal obtained by the transceiving means 100-102 is v1, v2, and v3, respectively. As these velocities v1, v2, and v3 are velocity components at the depression angle θ with a plane in parallel with the road surface (see FIG. 2), step S501 converts these velocities v1, v2, and v3 into velocity components in a plane in parallel with the road surface by Equations 2 to 4.

$$V1 = v1/\cos\theta \qquad \text{(Equation 2)}$$

$$V2 = v2/\cos\theta \qquad \text{(Equation 3)}$$

$$V3 = v3/\cos\theta \qquad \text{(Equation 4)}$$

Step S502 calculates the output offset (Vw) of respective transceiving means from velocities V1, V2, and V3 and the angular velocity component (yaw rate) around the z-axis of the vehicle using Equation 5.

$$Vw = (\sin\theta1(V1\cos\theta r - V2) - \sin\theta r(V1\cos\theta1 - V3))/(\sin\theta1(\cos\theta r - 1) - \sin\theta r(\cos\theta1 - 1)) \qquad \text{(Equation 5)}$$

When the angular velocity is represented by w, Vw is equal to rw. Therefore, we can get the angular velocity (yaw rate) w from Equation 5.

Step S503 calculates the differences between the velocities V1 to V3 and the output variations of the transceiving means 100 to 102 due to the influence of the rotational motion of the vehicle by Equations 6 to 8.

$$VF = V1 - Vw \qquad \text{(Equation 6)}$$

$$VL = V2 - Vw \qquad \text{(Equation 7)}$$

$$VR = V3 - Vw \qquad \text{(Equation 8)}$$

Where VF, VL, and VR respectively represent differences between velocities V1 to V3 and the angular velocity (the output offset).

The next steps S504 and S505 calculate the velocity in the fore direction of the vehicle (the first x-axis velocity Vx1) and the velocity in the aft direction of the vehicle (the second x-axis velocity Vx2). Here, Vx1 is equal to VF as Vx1 and VF are is in the same direction.

The second x-axis velocity Vx2 is the composition of fore and aft velocity components of VL and VR which are calculated from the outputs of the transceiving means 11 and 12. This is expressed by Equation 9.

$$Vx2 = |-(VR\cos\theta r + VL\cos\theta1)| \qquad \text{(Equation 9)}$$

Step S506 calculates the velocity Vx in the x-axis (in the fore and aft directions of the vehicle) from the first and second x-axis velocities Vx1 and Vx2. This is expressed by Equation 10.

$$Vx = (Vx1 + Vx2)/2 \qquad \text{(Equation 10)}$$

Step S507 calculates the ratio (Rx) of the second x-axis velocity Vx2 to the first x-axis velocity Vx1. This is expressed by Equation 11.

$$Rx = Vx2/Vx1 \qquad \text{(Equation 11)}$$

Step S508 calculates the y-axis velocity Vy (in the athwartship direction of the vehicle). The y-axis velocity is calculated as the composition of y-axis velocity components of VL and VR (by Equation 12) but must be compensated as the y-axis velocity is affected by pitching of the vehicle (tilting in the fore and aft directions of the vehicle).

$$Vy = VR\sin\theta r - VL\sin\theta1 \qquad \text{(Equation 12)}$$

The fore and aft tilting of the vehicle is reflected on the x-axis velocity ratio (Rx). Rx=1 indicates that the vehicle is running ideally without any pitching. Rx>1 indicates that the vehicle is pitching forward and Rx<1 indicates that the vehicle is pitching backward. Therefore, Vy corrected by Equation 13 is used as a new y-axis velocity Vy.

$$Vy \leftarrow Vy/Rx \qquad \text{(Equation 13)}$$

Step S509 calculates the side-skid angle β from the x-axis velocity Vx and the y-axis velocity Vy. This is expressed by Equation 14.

$$\beta = \arctan(Vy/Vx) \qquad \text{(Equation 14)}$$

As described above, we reduced influences of pitching of the vehicle on velocities in the fore, aft, and athwartship directions and increased the accuracy in measurement of ground velocities of the vehicle by calculating the velocities including the fore-aft pitching of the vehicle.

In this way, the ground-speed measuring apparatus of this invention can measure velocities in the fore, aft, and athwartship directions, and side-skid angles of the vehicle. Even when the movement of the vehicle contains a rotation around the vehicle center O1, the ground-speed measuring apparatus of this invention can measure velocities in the fore, aft, and athwartship directions, side-skid angles of the vehicle, and angular velocities of the vehicle without losing the rotational velocity component. Therefore, this apparatus can work both as a velocity sensor and an angular velocity sensor and need not an additional angular velocity sensor as in the case with conventional ground speed measuring apparatus. This can also has an effect to reduce the manufacturing cost of the apparatus. Further, when these three transceiving means are disposed on the vertices of an equilateral triangle, θ1 becomes equal to θr and the computation can be simplified.

Figure 6A:
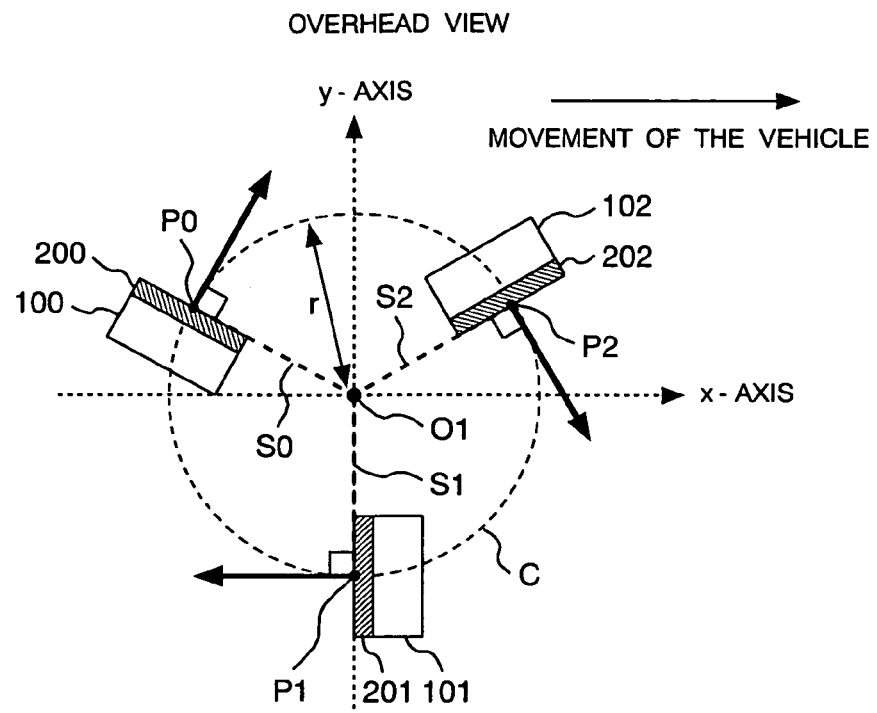
FIG. 6 shows an example of installation of the ground speed measuring apparatus which is an embodiment of this invention.

This invention does not always limit the layout of the transceiving means to that of FIG. 1. For example, the transceiving means 100 to 102 can be respectively turned by preset angles from the positions shown in FIG. 6(A) around the center O1. However, one of the transceiving means must face to the fore or aft direction of the vehicle (the x-axis direction) when the equations of this embodiment are used. When none of the transceiving means face to the fore or aft direction of the vehicle, Vx1 is not equal to VF and the velocity VF has velocity components in the fore-aft and athwartship directions. Therefore these velocity components must be calculated individually. However, also in this case, it is possible to measure velocities in the fore, aft, and athwartship directions, side-skid angles of the vehicle, and angular velocities of the vehicle similarly in principle.

Further, this embodiment disposes the transceiving means so that they may transmit waves tangentially to the circle and clockwise around the center of the circle (when viewed from the top). The similar effect can be obtained also when the transceiving means are disposed to transmit waves counter-clockwise.

Figure 6B:
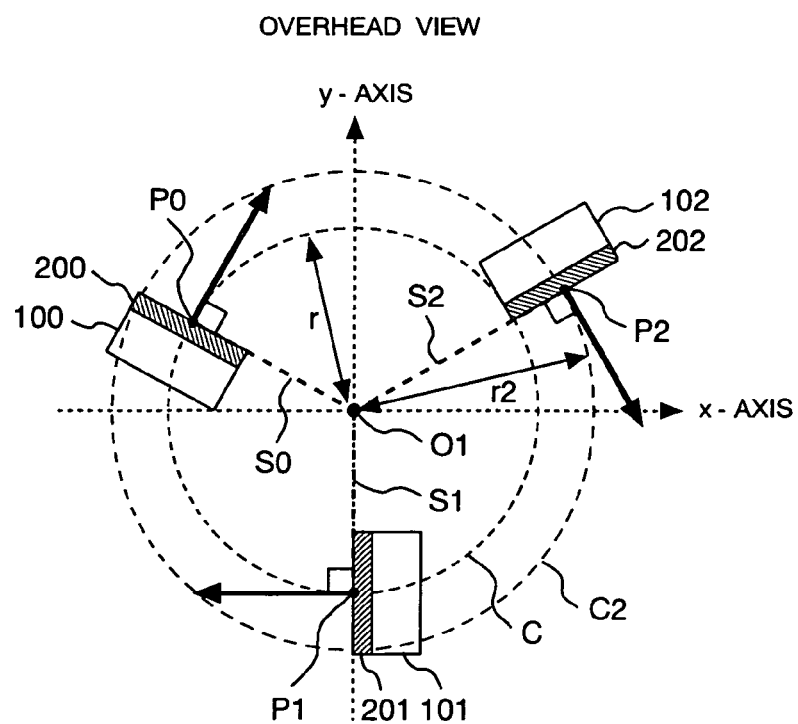

Furthermore, although this embodiment disposes three transceiving means on a circle, it is also possible to dispose the transceiving means on concentric circles (having a point O1 as the center) as shown in FIG. 6(B). In this case, the offsets are corrected by Equation 5 and the similar effect can be obtained. As long as three transceiving means are disposed to satisfy a preset relative positional condition, the wave transmission directions can be determined independently of the movement of the vehicle. Therefore, they can be mounted on the vehicle with less limitation.

Below will be explained an embodiment which uses the ground speed measuring apparatus of this invention for vehicle control.

In automobile fields, ABS (Anti-lock Brake System) and ESP (Electronic Stability Program) have been well known as safety means to stabilize an unstable vehicle (against a sliding, etc.). Similarly, an active suspension control has been well known to make vehicle riding comfortable.

The Antilock Brake System (ABS) controls to prevent wheels from being locked during sudden "panic" braking and the Electronic Stability Program (ESP) controls to prevent the vehicle from skidding during driver's steering control. The active suspension control means has actuators on the suspensions and causes the actuators to damp swaying of the vehicle.

These kinds of vehicle control require input information such as ground speeds and/or angular velocities of the vehicle. As employing a Janus type Doppler ground-speed measuring apparatus which is described above in "Prior Art" as a means to detect ground speeds and an angular velocity sensor such as a gyro sensor as a means to detect angular velocities, the current vehicle control system must be equipped with a plurality of sensors and enter their information of detection into the controller. This increases their installation spaces, limits their mounting positions, makes their wiring complicated, and increases their manufacturing cost.

Contrarily, the ground-speed measuring apparatus of this invention enables simultaneous measurement of both ground speeds and angular velocities by a single unit and can solve the above problems. Some embodiments will now be described more fully in detail with reference to the accompanying drawings.

Figure 7:
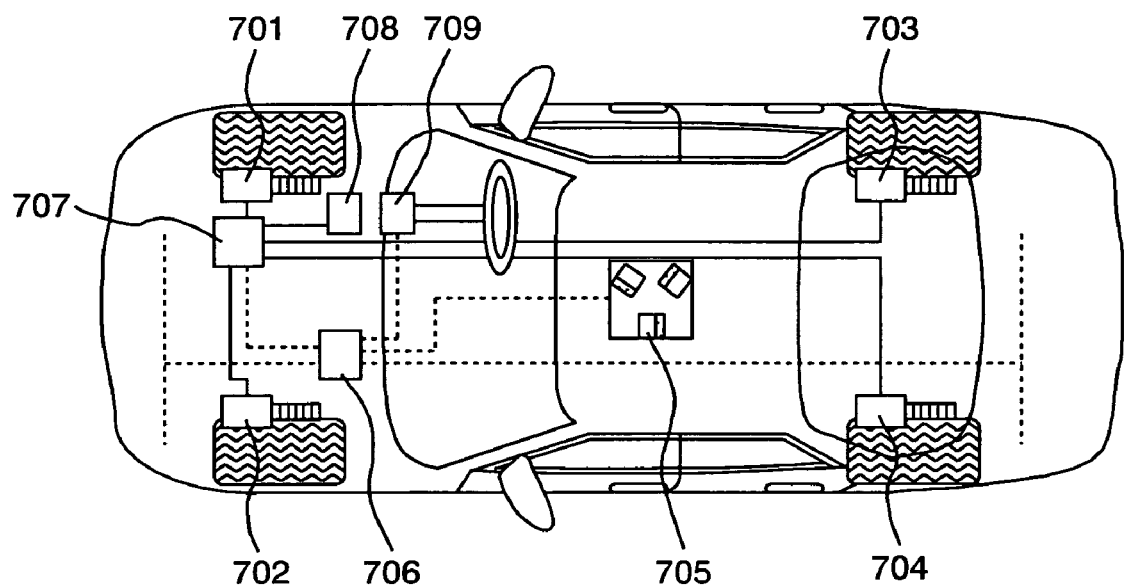
FIG. 7 shows an example of a vehicle having the ground speed measuring apparatus which is an embodiment of this invention.
Figure 8A:
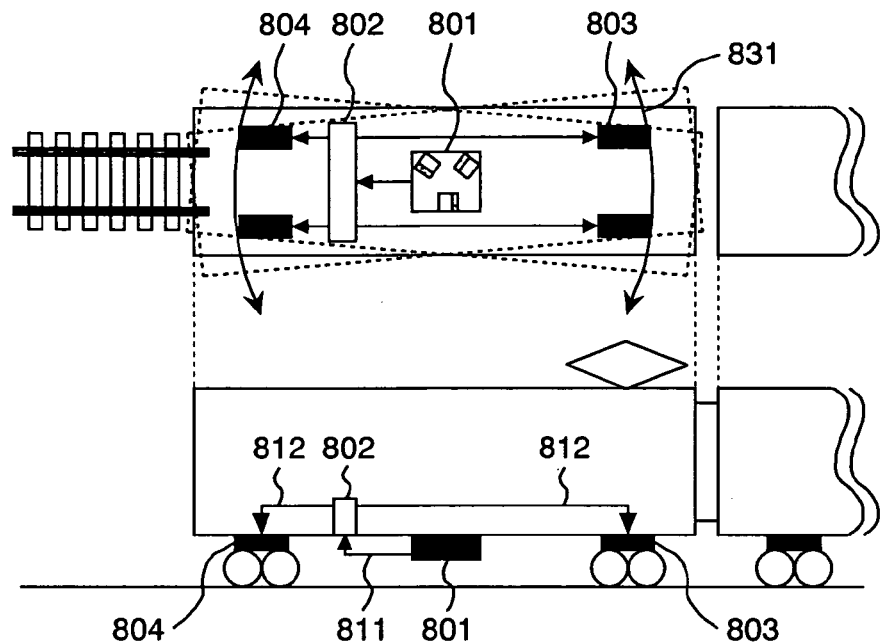
FIG. 8 shows examples of vehicles having the ground speed measuring apparatus which is embodiments of this invention.
Figure 8B:
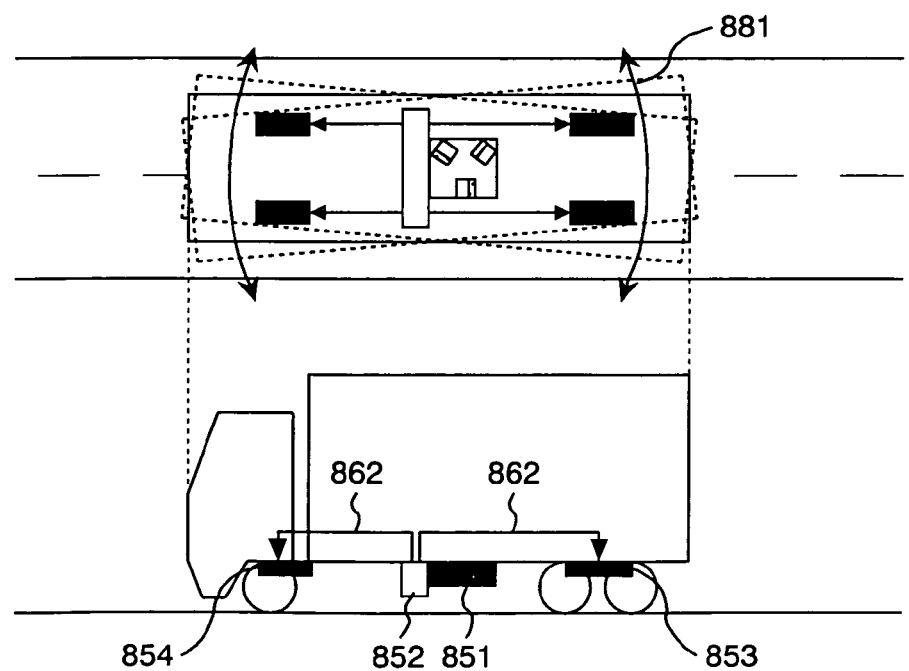

FIG. 7 shows an example of Electronic Stability Program (ESP) installed in a car. FIG. 8(A) and FIG. 8(B) respectively show an example of active suspension system installed in a train and an example of active suspension system installed in a car.

Referring to FIG. 7, 705 represents the ground-speed measuring apparatus of this invention. 701 to 704 respectively represent a brake caliper on each wheel. 706, 707, 708, and 709 respectively represent a controller, a hydraulic unit, a master cylinder, and a steering sensor in this order. The dotted lines represent signal lines and the solid lines represent hydraulic lines.

In this measuring system, the ground-speed measuring apparatus 705 detects velocities of the vehicle and angular velocities of the vehicle around the z-axis. The steering sensor 709 detects steering angles of the vehicle. The controller uses these kinds of detected information to individually control the braking forces for the brake calipers 701 to 704 on wheels. Substantially, if the vehicle is over-steered when taking a curve, the controller controls to brake the outer front wheel to prevent spinning. If the vehicle is under-steered, the controller controls to brake the inner rear wheel to turn the car body inwards or gives different braking forces to inner and outer wheels to stabilize the turning. Although this system uses oil pressure to drive the brake calipers, electrically-driven actuators can be used.

Referring to FIG. 8, 801 and 851 respectively represent the ground-speed measuring apparatus of this invention. 802 and 852 respectively represent a controller. 803, 804, 853, and 854 are actuators. 811, 812, and 862 represent signal lines and/or power transmission lines.

A running vehicle is subject to vibrations 831 or 881 (yawing) around the z-axis of the vehicle due to road surface conditions, wheel structures, and so on. This yawing gives various influences to passengers and loads on the vehicle. To suppress the yawing, the ground-speed measuring apparatus of this invention detects the vehicle velocity and the angular velocity around the z-axis (to be abbreviated simply as an angular velocity) and drives the actuators 803, 804, 853, and 854 to counteract the detected angular velocity.

The above ESP and active suspension control have been typical now, but the conventional ESP and active suspension controlling system uses a gyro sensor or the like to detect angular velocities and a ground speed measuring apparatus which is described in "Prior Art" to detect the ground velocity.

Contrarily, the ground speed measuring apparatus of this invention can measure the angular velocities and ground velocities simultaneously by a single unit. Of course, no additional sensor such as a gyro sensor is required to detect angular velocities. This can reduce its manufacturing cost. Further, this can make the apparatus compact, reduce the installation space, and shorten wires between the controller (706, 802, or 852) and sensors. Furthermore, it is possible to connect the ground speed measuring apparatus directly to the controller (as shown in FIG. 8(B)) or to house the apparatus and the controller in a box (not shown in the figure).

Still further, the ground speed measuring apparatus of this invention can detect angular velocities more quickly than a gyro sensor. This enables high-accuracy detection of angular velocities and high-accuracy vehicle controlling.

Next, we explain sample conditions and methods of mounting the ground speed measuring apparatus of this invention.

In principle, the ground speed measuring apparatus of this invention can be mounted in any manner as long as three transceivers satisfy the positional and angular conditions shown in FIG. 1 or FIG. 6 and FIG. 2

However, it is very complicated and time-consuming to mount the transceivers individually on the vehicle while satisfying the positional and angular conditions shown in FIG. 1 or FIG. 6 and FIG. 2. To solve this problem, it is recommended to assemble three transceivers in a unit to satisfy the preset positional and angular conditions and to mount this unit on a vehicle.

Figure 9A:
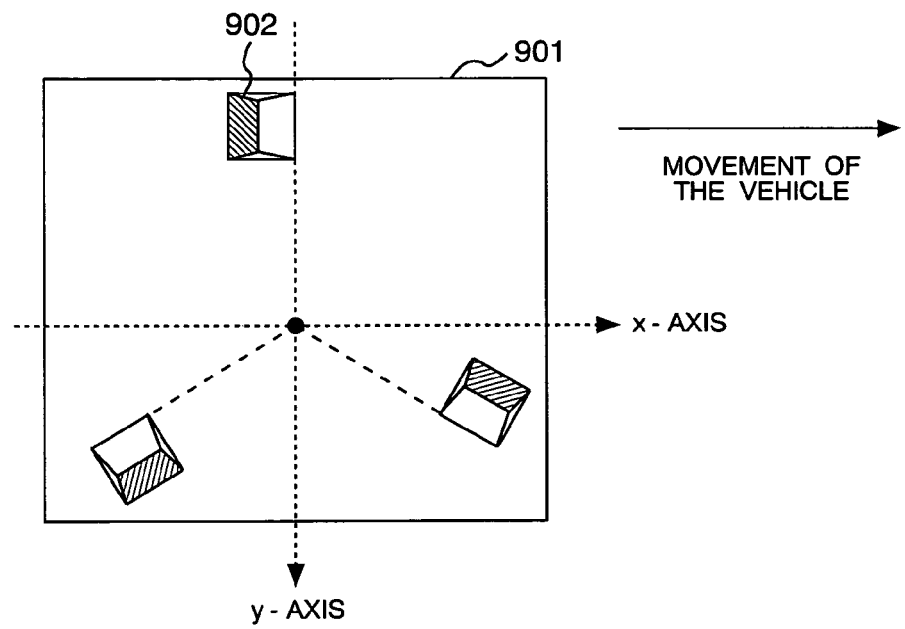
FIG. 9 shows an example of a mounting structure of the ground speed measuring apparatus which is an embodiment of this invention.
Figure 9B:
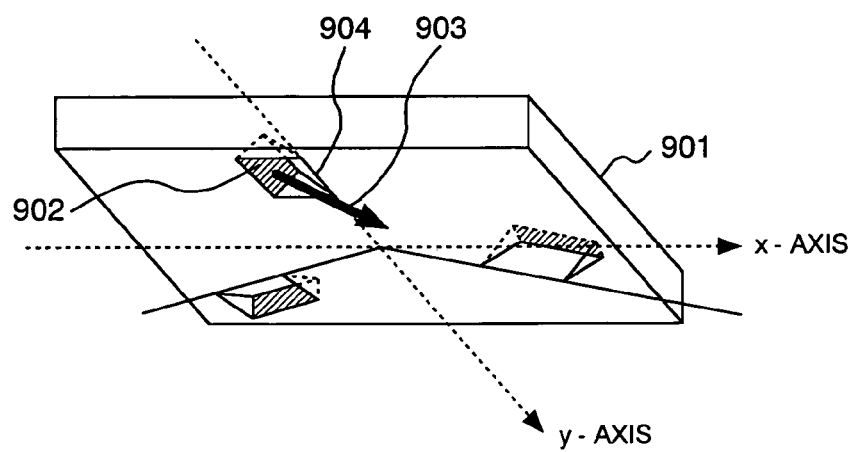

FIG. 9 shows an example of layout of the ground speed measuring apparatus of this invention on a vehicle. FIG. 9(A) is a worm's-eye view of the ground speed measuring apparatus and FIG. 9(B) is a perspective worm's-eye view of the ground speed measuring apparatus.

In FIG. 9, 901 is a box housing three transceivers 902 which transmit and receive waves. The transceiving block of each transceivers 902 are exposed outside from notches 904, respectively. Three transceivers 902 are disposed so that they may transmit waves tangentially to a circle on which they are seated (see FIG. 1) when viewed from the top and that they may be at a preset angle with the road surface as shown in FIG. 2.

This unit configuration makes high-precision mounting and installation of the apparatus easier than the configuration in which three transceivers are mounted individually.

Figure 10A:
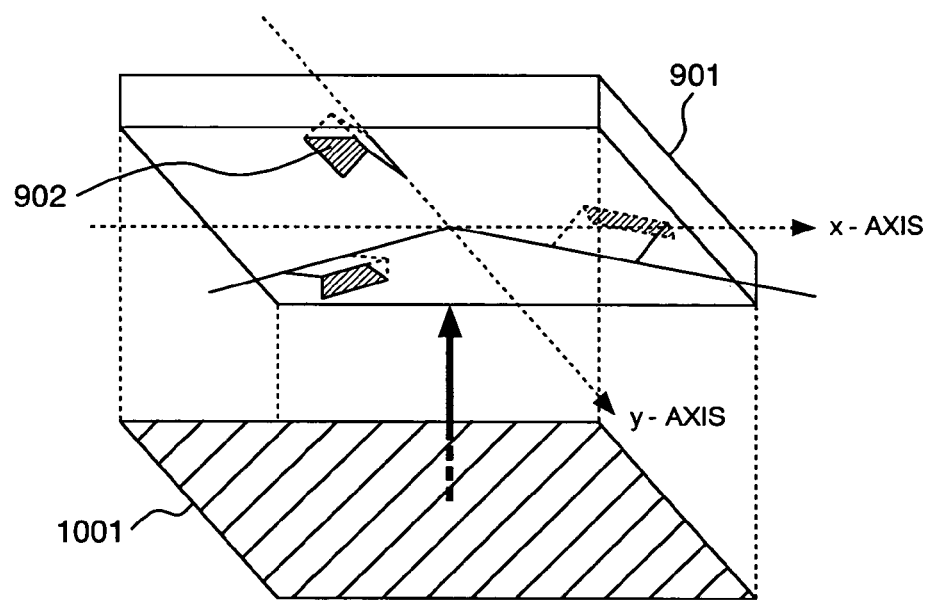
FIG. 10 shows an example of a mounting structure of the ground speed measuring apparatus which is an embodiment of this invention.
Figure 11A:
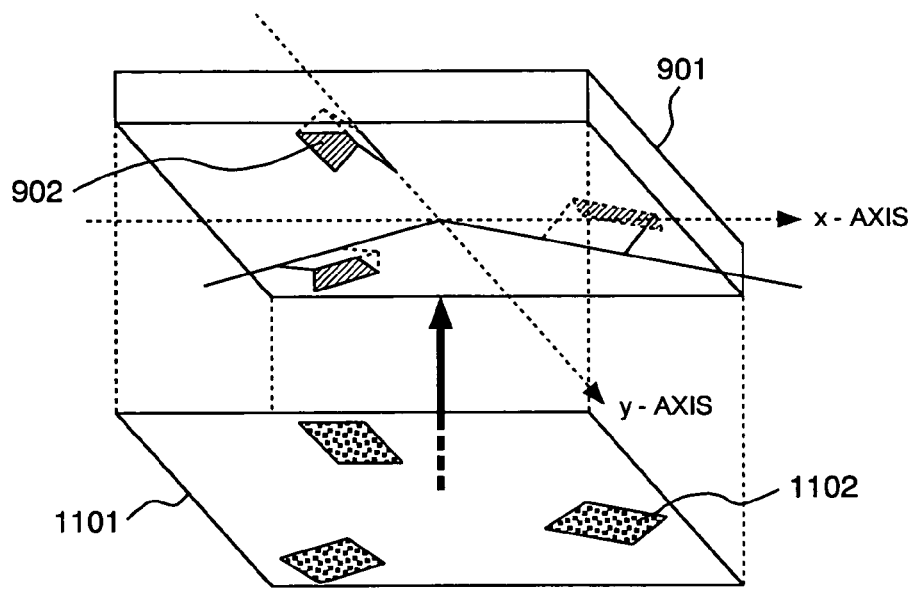
FIG. 11 shows an example of a mounting structure of the ground speed measuring apparatus which is an embodiment of this invention.

The unit bottom having notches through which the transceivers 902 are exposed outside can be covered with a cover member 1001 whose material can transmit waves from the transceivers 902 as shown in FIG. 10(A) or with a cover member 1001 whose areas 1102 facing to the notches 904 are made of materials that can transmit waves as shown in FIG. 11(A). This cover can protect the transceivers 902 against water, dust, sands, and any other contaminants that come from the outside of the vehicle.

Further, it is possible to make the unit bottom (facing to the road surface of the box 901) itself made of a wave-transmittable material instead of covering the unit bottom with the above cover of FIG. 10(A) and FIG. 11(A). This can make assembling and installation of the ground speed measuring apparatus much simpler and easier.

Figure 11B:
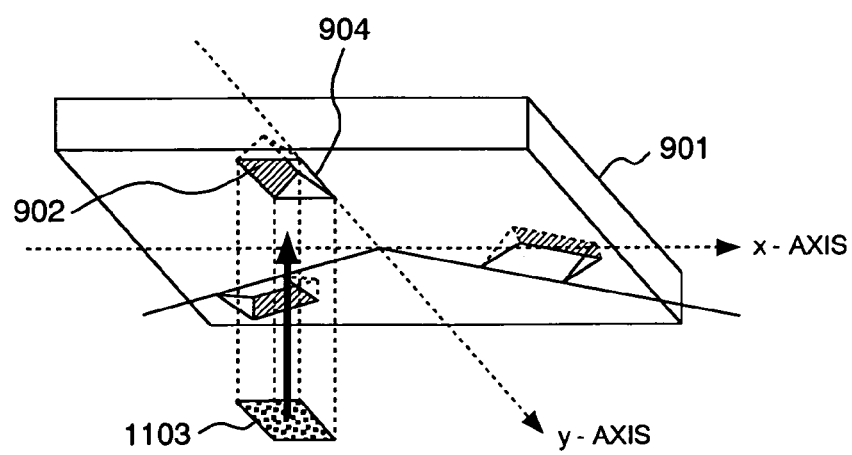

Furthermore, it is possible to cover each notch 904 of FIG. 9 with a separate cover member 1103 as shown in FIG. 11(B).

Figure 10B:
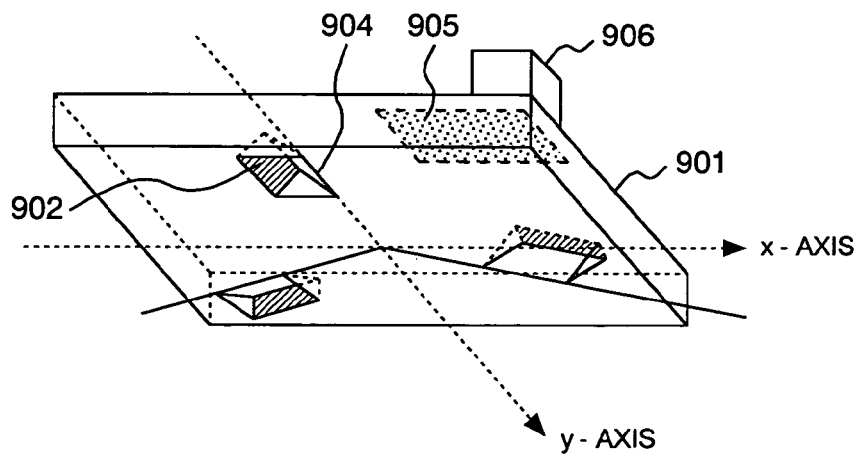

As shown in FIG. 10(B), it is possible to provide a processing section 905 for generating waves and processing transmitted and received signals inside the box (unit) 901 and a connection section for connecting signal and power lines to the vehicle on the outer wall of the box 901. This configuration enables installation of the ground speed measuring apparatus and connection of its signal and power lines to the vehicle at the same time. This simplifies the installation works of the apparatus greatly. In this embodiment, the processing section 905 can contain all or part of the modulator 303, the oscillator 304, a mixing circuit 305, an analog circuit 306, an A/D converter 307, an FFT processing section 308, and a signal processor 309 shown in FIG. 3.

Figure 13A:
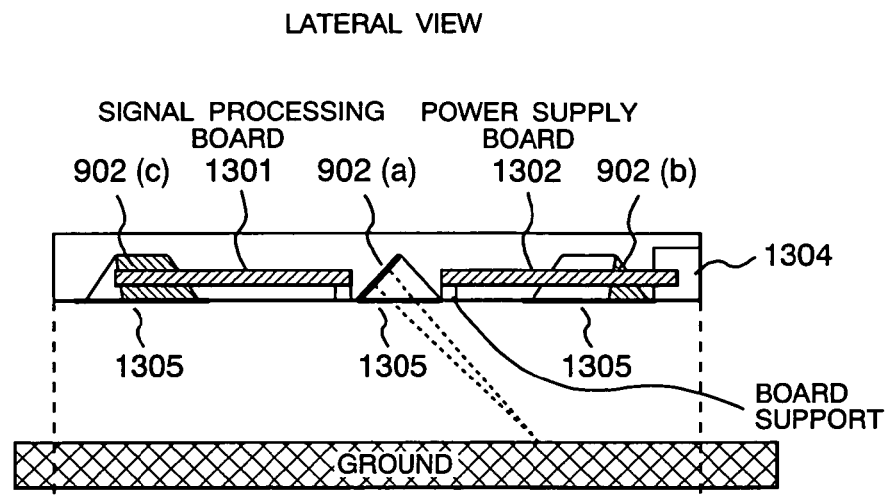
FIG. 13 shows an example construction of a ground-speed measuring apparatus which is an embodiment of this invention.
Figure 13B:
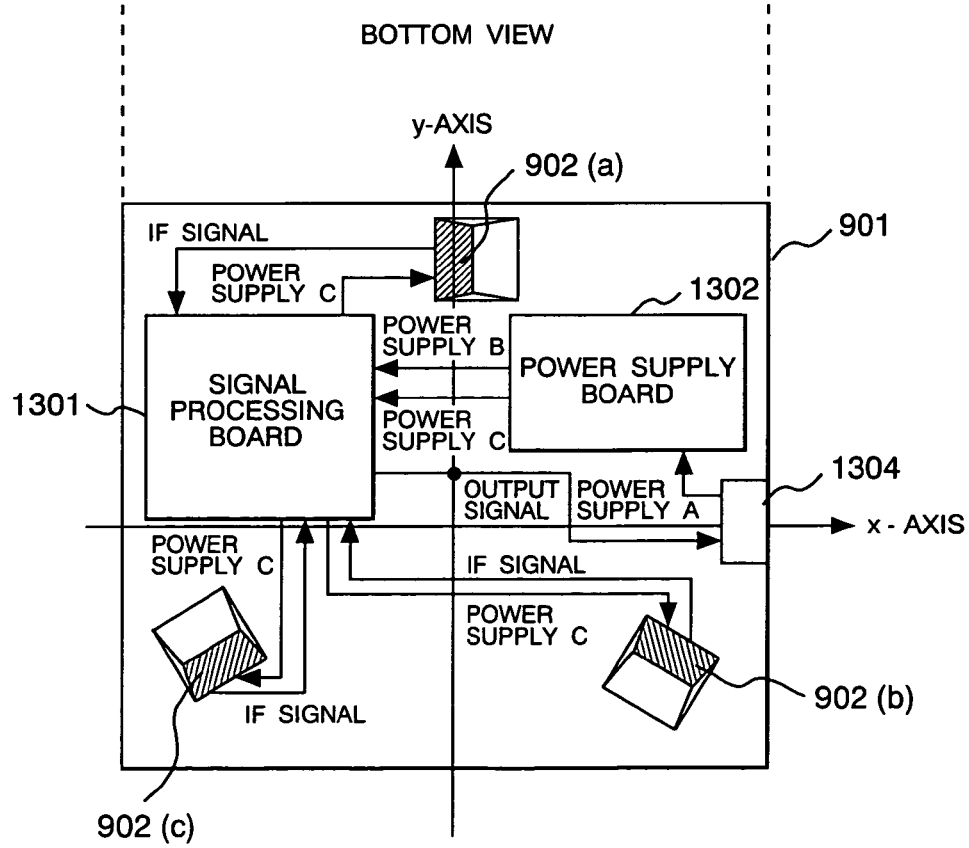
Figure 14A:
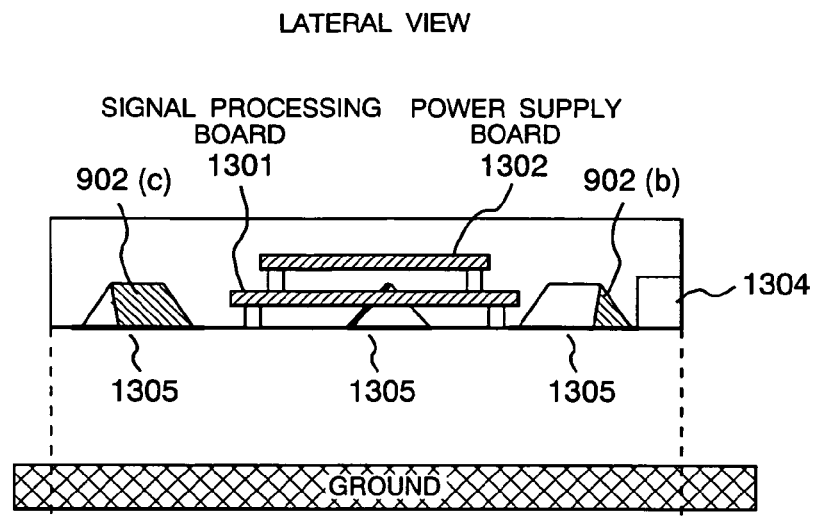
FIG. 14 shows a variation of the embodiment of FIG. 13.
Figure 14B:
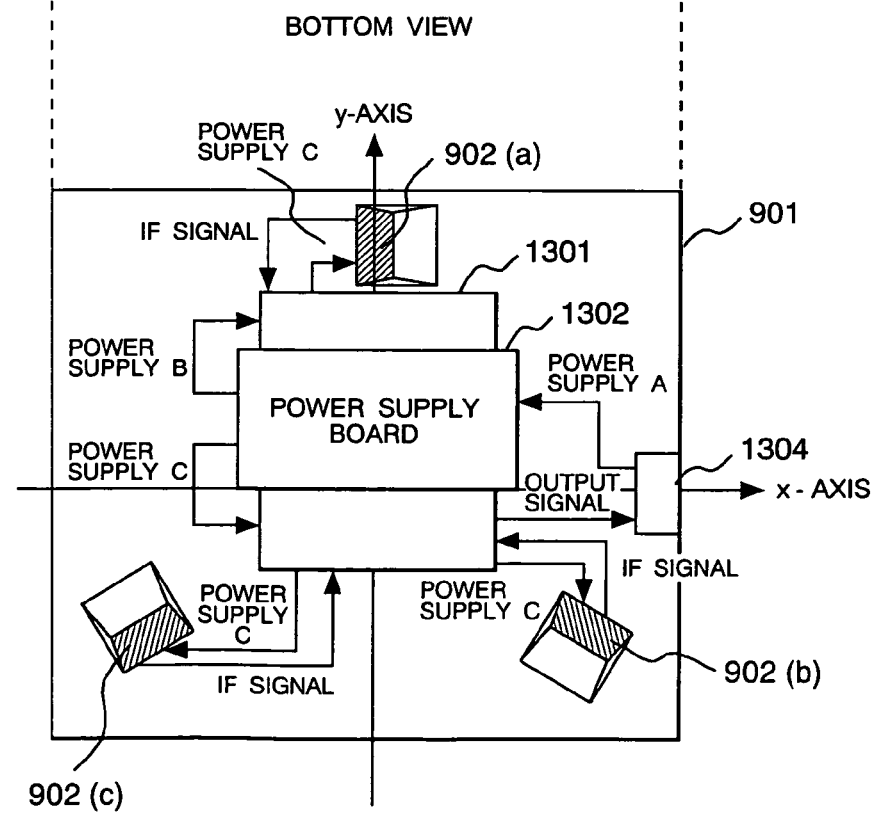

Referring to FIG. 13 and FIG. 14, we'll explain an embodiment of the interior of the ground-speed measuring apparatus of FIG. 9 to FIG. 11.

FIG. 13(a) shows a side view of the ground-speed measuring apparatus of FIG. 9 to FIG. 11 and FIG. 13(b) shows a bottom view of the apparatus. As explained above, three transceiving means 902(a), 902(b), and 902(c) are laid out in place on the common box 901 as shown in FIG. 1, FIG. 5, and FIG. 6. The transceiving means 902(a), 902(b), and 902(c) are equivalent to the means 200 in FIG. 2. Each of the transceiving means 902(a), 902(b), and 902(c) is comprised of a microwave monolithic integrated circuit (MMIC) which contains a modulator 303, a transmitter 304, a mixing circuit 305, and so on, and a transceiving means (equivalent to the transceiving means 100, 101, or 102 of FIG. 1) which contains an analog circuit 306. Each of the transceiving means 902(a), 902(b), and 902(c) transmits an electric wave, receives its reflection on the ground, generates an intermediate frequency (IF) signal from the transmitted and received signals, amplifies and outputs this IF signal. This IF signal is fed to a signal processing board 1301 in the box 901. The signal processing board 1301 is equipped with an A/D converter 307, an FFT processor 308, and a signal processor 309, converts the received IF signal to a digital signal, performs a fast Fourier transform (FFT) on the signal, and gets the ground speed and angular velocity of the vehicle from peaks of the result.

The signal processing board 1301 receives IF signals from three transceiving means 902(a), 902(b), and 902(c). This board 1301 is also equipped with a storage section that stores the location of the ground-speed measuring apparatus on the vehicle (e.g. deviation from the center of rotation of the vehicle) and the mounting angle of the apparatus on the vehicle (e.g. angle between the wave transmission direction and the movement of the vehicle). This board 1301 calculates the ground speed and other values of the vehicle from peaks detected in three IF signals sent from three transceiving means and information related to their installation using the above Equations (1) to (14).

A power supply board 1302 in the box 901 receives electric power from the outside of the apparatus, converts it to voltages fit to the transceiving means 902(a), 902(b), and 902(c), and sends the voltages to the transceiving means. The box 901 is equipped with a single connector that contains power supply wires from the in-vehicle power supply and output signal wires to output the result of measurement such as a ground speed from the signal processing board to the outside of the apparatus.

As these three transceiving means share the power supply board 1302 and the signal processing board 1301 in this way, the apparatus can be simplified, down-sized and be placed anywhere under the vehicle floor. Further, although the measuring means using electric waves must have a common ground potential, these three transceiving means can easily have a common ground potential by sharing the power supply board 1302. Furthermore, this embodiment has the power supply board 1302 and the signal processing board 1301 at an identical horizontal level. This structure can reduce the height of the box 901 and release the dimensional limitation of the box under the vehicle floor.

FIG. 14 is a variation of the embodiment of FIG. 13. Although the embodiment of FIG. 13 can reduce the height of the box 901 as it has the power supply board 1302 and the signal processing board 1301 at an identical horizontal level, its horizontal dimensions cannot be reduced so much. In contrast, this embodiment piles up these boards 1301 and 1302. This makes the vertical dimensions of the box 901 a little greater than those of the embodiment but can reduce the horizontal dimensions of the box.

There are various kinds of vehicles from light cars to heavy-duty trucks and they have various dimensional limitations. For example, a box that is smaller in horizontal dimensions may be preferable for light cars and compact cars whose under-floor areas are limited. Further, a box that is smaller in vertical dimensions may be preferable for off-road vehicles to secure a greater vehicle height. Accordingly, box structures of FIG. 13 and FIG. 14 can be selectively used according to the types and uses of vehicles.

Figure 15:
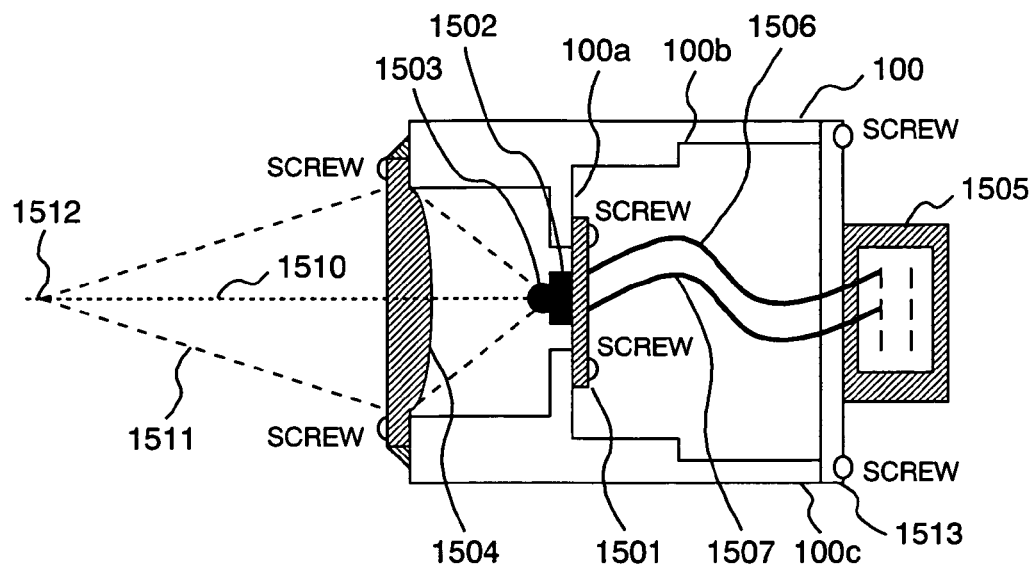
FIG. 15 shows an example construction of a transceiving means which is an embodiment of this invention.

Referring to FIG. 15, an embodiment of the transceiving means 902(a), 902(b), and 902(c) will be explained in more detail below. In FIG. 9 to FIG. 14, only the transceiving section 902 (equivalent to the transceiving means 200, 201, and 202 in FIG. 1 and the transceiving means 200 in FIG. 3) is explained and it seems like a flat plate. Actually, however, it is built up as a transceiving means (equivalent to the transceiving means 100, 101, and 102 in FIG. 1) that includes a circuit to transmit an electric wave from the relevant transceiving section.

As shown in FIG. 15, the transceiving means 1500 is equipped with a high-frequency circuit board 1501. This high-frequency circuit board 1501 is equipped with a microwave monolithic integrated circuit (MMIC) 1502. The MMIC 1502 is an integrated circuit comprising a transceiving section 200 (transmitter and receiver), a modulator 303, a transmitter 304, and a mixing circuit 305. It transmits an electric wave, receives its reflection on the ground, and mixes the transmitted and received waves. Further, it amplifies the resulting low-frequency signal (which is also termed as an intermediate frequency (IF) signal). The amplified signal is sent to the signal processing board 1301 of FIG. 15 and so on. Here, signal wires 1506 and power supply wires 1507 from the high-frequency circuit board 1501 are connected to the connector on the cover 1513. The high-frequency circuit board 1501 receives power from the outside and transfers signals to and from the outside through this connector.

As for a Doppler ground-speed measuring apparatus like this embodiment using electric waves, electric waves transmitted from the transceiving means spread wide at a certain angle. When the electric waves spreads, the transceiving means receive innumerable reflected waves of different velocity components in every direction. This may decrease the accuracy of velocity measurement. Therefore, it is ideal that the electric waves are emitted like a straight line (1510) as shown in FIG. 15. However, as the spreading angle of electric waves is approximately in inverse proportion to the width of the transceiving means, the spreading angle of the electric waves may be greater as the transceiving means is made smaller.

To converge the electric waves that are transmitted from the transceiving antenna, this embodiment provides a primary lens in the wave transmission side of the transceiving section 200 of MMIC 1502. It is preferable that the primary lens 1503 is shaped convex as shown in FIG. 15(b). This lens shape can converge the electric waves transmitted from the transceiving section to a predetermined angle. This configuration can increase the accuracy of measurement of a ground speed of the vehicle while reducing the size of the transceiving section.

Further, this embodiment places a secondary lens 1504 before the primary lens to converge the transmitted waves further (1511). It is more preferable to mount the ground-speed measuring apparatus on the vehicle with the focus 1512 put on the road surface because the same effect as the electric waves are transmitted in a straight line can be obtained.

Figure 16:
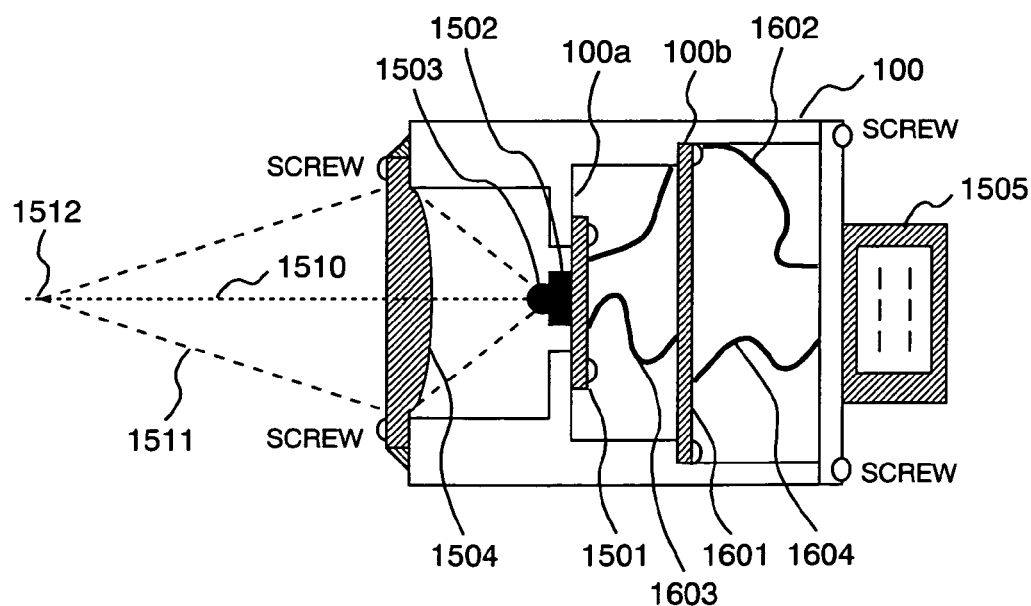
FIG. 16 shows another construction of a transceiving means which is another embodiment of this invention.

FIG. 16 is a variation of the transceiving means 100, 101, and 102 of FIG. 1 and others. The embodiment of FIG. 16 is the same as the embodiment of FIG. 16 but the embodiment of FIG. 16 has a power supply board 1601 in the transceiving means 100. In this case, the common power supply board 1302 like that of FIG. 13 is not needed but each transceiving means must be equipped with a power supply board 1601. Each of these power supply boards 1601 receives power from the in-vehicle power supply such as a car battery, converts it to a proper voltage, and supplies it to the high-frequency circuit board 1501 and so on. The power supply board 1601 is connected to the high-frequency circuit board 1501 with the power wires 1604 and the connector 1605. The power supply board 1601 receives power from the outside of the transceiving means 100 through the power lines 1604 and the connector 1605.

Each transceiving means (100, 101, or 102) of the embodiments of FIG. 15 and FIG. 16 contains a high-frequency circuit board 1501 or a set of a high-frequency circuit board 1501 and a power supply board 1601 in a cylindrical structure 100c having an opening (whose sectional shape can be any of a circle, a polygon, and an irregular figure). The cylindrical structure 100c has flange-like protrusions 100a and 100b on the inner wall of the structure 100c. When the high-frequency circuit board 1501 is inserted into the cylindrical structure 100c, its peripheral edges are stopped and supported by the flange-like protrusion 100a. In this case, the high-frequency circuit board 1501 is installed with the transceiving antenna and the primary lens projected from the central opening of the flange 100a. To enable accurate positioning of the high-frequency circuit board 1501 in the structure 100c, projection 100a, or the high-frequency circuit board 1501 can have protrusions, dents, or both to be fit to each other. In the embodiment of FIG. 16, the power supply board 1601 is butted with the protrusion 100b. The high-frequency circuit board 1501 is first inserted into the cylindrical structure through the central opening of the flange-like protrusion 100b and then the power supply board 1601 is inserted into the cylindrical structure. After the power supply board 1601 is installed, the opening of the structure is closed with a cover 1513. A connector 1505 can be provided on the cover 1513 to connect signal wires, power wires, or both to the outside. This enables installation of a connector on a place of a simpler shape even when the cylindrical structure has a complicated shape. This makes the production of the apparatus easier.

Furthermore, the embodiments of FIG. 15 and FIG. 16 respectively have a secondary lens 1504 on an opening of the structure opposite to the opening through which the high-frequency circuit board is inserted. This makes adjustment of the mounting angle and location of the secondary lens. When the lens 1504 also works as the cover of the opening, the number of parts of the apparatus can be reduced.

This invention can improve the measuring performance of a ground speed measuring apparatus and enables a single ground speed measuring apparatus to measure velocities in the fore, aft, and athwartship directions, side-skid angles of the vehicle, and angular velocities of the vehicle.

What is claimed is:

1. A ground-speed measuring apparatus, comprising at least three transceivers, each of which transceivers contains a transmitter for transmitting a wave and a receiver for receiving a reflection of the wave transmitted from the transmitter, wherein
said at least three transceivers are placed outside a cylindrical area whose axis of symmetry passes through a point on a floor of the vehicle,
three straight lines which respectively pass through said transceivers perpendicularly thereto intersect with each other or skewed in said cylindrical area, and the transmitter of each transceiver is at a preset angle with the floor of the vehicle, and
said three transceivers are disposed on concentric circles having a certain point as its center point so that said transceivers may face perpendicularly to a straight line passing through the center point and each transceiver.

2. The ground-speed measuring apparatus of claim 1, wherein the center of said concentric circles and said transceivers are respectively at the preset angle with the floor of the vehicle.

3. The ground-speed measuring apparatus of claim 2, wherein said at least three transceivers are disposed on a single circle.

4. The ground-speed measuring apparatus of claim 3, wherein said at least three transceivers are disposed at preset intervals so that they may be respectively on each vertex of an equilateral triangle.

5. The ground-speed measuring apparatus of claim 1, wherein one of said at least three transceivers is arranged in the direction of movement of the vehicle.

6. The ground-speed measuring apparatus of claim 1, wherein said at least three transceivers are housed in a single box.

7. The ground-speed measuring apparatus of claim 6, wherein said box, when mounted on a vehicle, has notches on the surface opposite to the road surface and said transceivers are exposed through said notches.

8. The ground-speed measuring apparatus of claim 6, wherein the surface of said box opposite to the road surface when mounted on a vehicle is made of a material through which the transceivers can transmit and receive waves.

9. The ground-speed measuring apparatus of claim 6, wherein a side of said box opposite to the road surface when mounted on a vehicle is wholly or partially covered with a cover member which is made of a material through which the transceivers can transmit and receive waves.

10. The ground-speed measuring apparatus of claim 5, wherein said box houses a processor section that originates waves for the transceiver and/or processes transmitted and received signals and a connector section which is provided on the outer wall of said box to connect signal lines and/or power lines from said processing section to said vehicle.

11. A method of mounting, at least three transceivers on a vehicle, each of which transceivers contains a transmitter for transmitting a wave and a receiver for receiving a reflection of the wave transmitted from the transmitter, comprising placing said at least three transceivers outside a cylindrical area whose axis of symmetry passes through a point on the floor of the vehicle so that said at least three transceivers are disposed on concentric circles having a certain point as center tangentially to the circle perpendicularly to a straight line passing through the center point and each transceiver and three straight lines which respectively pass through said at least three transceivers perpendicularly thereto intersect with each other or are skewed in said cylindrical area, and tilting the transmitter of each transceiver at a preset angle with the floor of the vehicle.

12. The mounting method of claim 11, further comprising disposing said at least three transceivers on a circle.

13. The mounting method of claim 12, further comprising of disposing said at least three transceivers respectively on vertices of an equilateral triangle.

14. The mounting method of claim 11, further comprising arranging one of said at least three transceivers in the direction of movement of the vehicle.

15. The mounting method of claim 11, wherein further comprising first mounting said at least three transceivers in a box and then mounting said box on the vehicle.

16. The mounting method of claim 15, further comprising attaching a cover member made of a material through which said transceivers can transmit and receive waves at least part of a surface of said box that faces the road surface.

* * * * *

UNITED STATES PATENT AND TRADEMARK OFFICE
CERTIFICATE OF CORRECTION

PATENT NO. : 7,372,395 B2 Page 1 of 1
APPLICATION NO. : 10/872457
DATED : May 13, 2008
INVENTOR(S) : Takao Kojima, Satoru Kuragaki and Shiho Izumi It is certified that error appears in the above-identified patent and that said Letters Patent is hereby corrected as shown below:

On the title page item [75] should read:
(75) Inventors: Takao Kojima, Hitachi (JP); Satoru Kuragaki, Isehara (JP); Shiho Izumi, Hitachi (JP)

Signed and Sealed this

Twenty-sixth Day of August, 2008

JON W. DUDAS
*Director of the United States Patent and Trademark Office*